United States Patent
De Francisci Morales et al.

(10) Patent No.: US 9,817,911 B2
(45) Date of Patent: Nov. 14, 2017

(54) METHOD AND SYSTEM FOR DISPLAYING CONTENT RELATING TO A SUBJECT MATTER OF A DISPLAYED MEDIA PROGRAM

(71) Applicants: Gianmarco De Francisci Morales, Catalunya (ES); Roi Blanco, Catalunya (ES); Fabrizio Silvestri, Pisa (IT)

(72) Inventors: Gianmarco De Francisci Morales, Catalunya (ES); Roi Blanco, Catalunya (ES); Fabrizio Silvestri, Pisa (IT)

(73) Assignee: EXCALIBUR IP, LLC, New York, NY (US)

( * ) Notice: Subject to any disclaimer, the term of this patent is extended or adjusted under 35 U.S.C. 154(b) by 239 days.

(21) Appl. No.: 13/891,854

(22) Filed: May 10, 2013

(65) Prior Publication Data
US 2014/0337308 A1    Nov. 13, 2014

(51) Int. Cl.
*G06F 17/30* (2006.01)
*H04N 21/234* (2011.01)
*H04N 21/239* (2011.01)
*H04N 21/2665* (2011.01)
*H04N 21/462* (2011.01)

(52) U.S. Cl.
CPC ..... *G06F 17/3089* (2013.01); *H04N 21/2393* (2013.01); *H04N 21/23418* (2013.01); *H04N 21/2665* (2013.01); *H04N 21/4622* (2013.01)

(58) Field of Classification Search
CPC ......... G06F 17/30752; G06F 17/30817; G06F 17/3089; H04N 21/23418; H04N 21/2393; H04N 21/2665; H04N 21/4622
See application file for complete search history.

(56) References Cited

U.S. PATENT DOCUMENTS 5,826,261 A * 10/1998 Spencer ............ G06F 17/30616
6,738,678 B1 * 5/2004 Bharat ............. G06F 17/30864
                                                                358/403

(Continued)

OTHER PUBLICATIONS

T. Brants, F. Chen, and A. Farahat. A system for new event detection. In Proceedings of the 26th annual international ACM SIGIR conference on Research and development in informaion retrieval, SIGIR '03, pp. 330-337. ACM, 2003.

(Continued)

*Primary Examiner* — Shiow-Jy Fan
(74) *Attorney, Agent, or Firm* — James J. DeCarlo; Greenberg Traurig, LLP

(57) ABSTRACT

Disclosed is a system and method for analyzing, by a server computer, closed captioning text associated with a media program being experienced by a user having a client device. The server computer obtains, based on the analyzing, a subject matter of a portion of the media program from the closed captioning text. The server computer constructs a query associated with the determined subject matter and submits the query to a computer network as a search query. The server computer receives, in response to the submitting of the query, content relating to the subject matter and measures an elapsed time period between the receiving of the content and the obtaining of the subject matter. If the elapsed time period is less than a predetermined period of time, the server computer communicates, to the client device, information related to the content.

17 Claims, 9 Drawing Sheets

(56) References Cited

U.S. PATENT DOCUMENTS

| | | | |
|---|---|---|---|
| 6,903,779 B2 | 6/2005 | Dyer | |
| 7,739,596 B2 | 6/2010 | Clarke-Martin et al. | |
| 7,900,145 B2 | 3/2011 | Blinnikka | |
| 8,060,509 B2 | 11/2011 | deVries et al. | |
| 8,219,911 B2 | 7/2012 | Clarke-Martin et al. | |
| 8,527,493 B1* | 9/2013 | Hamatake | 707/707 |
| 2003/0204536 A1* | 10/2003 | Keskar | G06F 9/4443 |
| 2005/0234877 A1* | 10/2005 | Yu | 707/3 |
| 2006/0252412 A1* | 11/2006 | Yamato | H04W 92/02 455/412.1 |
| 2007/0022072 A1* | 1/2007 | Kao et al. | 706/45 |
| 2007/0124752 A1* | 5/2007 | Sakai | 725/8 |
| 2008/0071784 A1* | 3/2008 | Hertzog | G06Q 30/02 |
| 2008/0111822 A1 | 5/2008 | Horowotz et al. | |
| 2008/0126387 A1 | 5/2008 | Blinnikka | |
| 2008/0172293 A1 | 7/2008 | Raskin et al. | |
| 2008/0204595 A1* | 8/2008 | Rathod et al. | 348/465 |
| 2008/0249986 A1 | 10/2008 | Clarke-Martin et al. | |
| 2008/0281689 A1 | 11/2008 | Blinnikka et al. | |
| 2009/0083257 A1* | 3/2009 | Bargeron | G06F 17/30734 |
| 2009/0164904 A1* | 6/2009 | Horowitz et al. | 715/723 |
| 2011/0078754 A1* | 3/2011 | Howcroft | H04N 7/17318 725/110 |
| 2012/0169771 A1* | 7/2012 | Muratsu | G09G 5/00 345/637 |
| 2012/0207447 A1 | 8/2012 | deVries et al. | |
| 2012/0209843 A1 | 8/2012 | deVries et al. | |
| 2012/0239496 A1 | 9/2012 | Clarke-Martin et al. | |
| 2013/0297778 A1* | 11/2013 | Hong | G06F 17/3089 709/224 |
| 2014/0109137 A1* | 4/2014 | Mushtaq et al. | 725/37 |
| 2014/0244662 A1* | 8/2014 | Mo et al. | 707/748 |

OTHER PUBLICATIONS

C. Buckley and E. M. Voorhees. Retrieval evaluation with incomplete information. In Proceedings of the 27th annual international ACM SIGIR conference on Research and development in information retrieval, SIGIR '04, pp. 25-32. ACM, 2004.

G. Kumaran and J. Allan. Text classification and named entities for new event detection. In Proceedings of the 27th annual international ACM SIGIR conference on Research and development in information retrieval, SIGIR '04, pp. 297-304. ACM, 2004.

M. Morita and Y. Shinoda. Information Filtering based on user behavior analysis and best match text retrieval. In Proceedings of the 17th annual international ACM SIGIR conference on Research and development in information retrieval, SIGIR '94, pp. 272-281. Springer-Verlag New York, Inc., 1994.

Y. Yang, T. Pierce, and J. Carbonell. A study of retrospective and on-line event detection. In Proceedings of the 21st annual international ACM SIGIR conference on Research and development in information retrieval, SIGIR '98, pp. 28-36. ACM, 1998.

F. Y. Y. Choi. Advances in domain independent lineart ext segmentation. In Proceedings of the 1st North American chapter of the Association for Computational Linguistics conference, NAACL 2000, pp. 26-33. Association for Computational Linguistics, 2000.

N. J. Belkin and W. B. Croft. Information filtering and information retrieval: two sides of the same coin? Commun. ACM, 35(12):29-38, 1992.

R. Blanco, H. Halpin, D. M. Herzig, P. Mika, J. Pound, H. S. Thompson, and T. Tran Duc. Repeatable and reliable search system evaluation using crowdsourcing. In Proceedings of the 34th international ACM SIGIR conference on Research and development in Information Retrieval, SIGIR '11, pp. 923-932. ACM, 2011.

G. De Francisci Morales, A. Gionis, and C. Lucchese. From Chatter to Headlines: Harnessing the Real-Time Web for Personalized News Recommendation. In WSDM '12: 5th ACM International Conference on Web Search and Data Mining, pp. 153-162. ACM Press, 2012.

I. Soboro and D. Harman. Novelty detection: the TREC experience. In Proceedings of the conference on Human Language Technology and Empirical Methods in Natural Language Processing, HLT '05, pp. 105-112. Association for Computational Linguistics, 2005.

A. G. Hauptmann. Story segmentation and detection of commercials. In in Broadcast News Video, Advances in Digital Libraries Conference, p. 24, 1998.

D. A. Hull, J. O. Pedersen, and H. Schutze. Method combination for document filtering. In Proceedings of the 19th annual international ACM SIGIR conference on Research and development in information retrieval, SIGIR '96, pp. 279-287. ACM, 1996.

M. Matthews, P. Tolchinsky, P. Mika, R. Blanco, and H. Zaragoza. Searching through time in the New York Times Categories and Subject Descriptors. Information Retrieval, 2010.

D. Beeferman, A. Berger, and J. Lafferty. Statistical models for text segmentation. Mach. Learn., 34(1-3):177-210, 1999.

T. A. H. Bell and A. Moffat. The design of a high performance information filtering system. In Proceedings of the 19th annual international ACM SIGIR conference on Research and development in information retrieval, SIGIR '96, pp. 12-20. ACM, 1996.

J. Allan, R. Papka, and V. Lavrenko. On-line new event detection and tracking. In Proceedings of the 21st annual international ACM SIGIR conference on Research and development in information retrieval, SIGIR '98, pp. 37-45. ACM, 1998.

T. Sakai. Alternatives to bpref. In W. Kraaij, A. P. de Vries, C. L. A. Clarke, N. Fuhr, and N. Kando, editors, SIGIR 2007: Proceedings of the 30th Annual International ACM SIGIR Conference on Research and Development in Information Retrieval, Amsterdam, The Netherlands, Jul. 23-27, 2007, pp. 71-78. ACM, 2007.

A. Farahat, F. Chen, and T. Brants. Optimizing story link detection is not equivalent to optimizing new event detection. In Proceedings of the 41st Annual Meeting on Association for Computational Linguistics—vol. 1, ACL '03, pp. 232-239. Association for Computational Linguistics, 2003.

R. Papka. On-line New Event Detection, Clustering, and Tracking. Ph.d. thesys at CIIR, University of Massachusetts, 1999.

M. T. S. Robertson, H. Zaragoza H. Simple BM25 extension to multiple weighted fields. In CIKM '04: Proceedings of the thirteenth ACM international conference on Information and knowledge management, pp. 42-49, New York, NY, USA, 2004. ACM.

D. W. Oard. The state of the art in text filtering. User Modeling and User-Adapted Interaction, 7(3):141-178, 1997.

M. Henzinger, B. Milch, B-W Chang and S. Brin. Query-free news search, WWW2003, ACM, May 20-24, 2003, Budapest, Hungary.

J. Allan, editor. Topic detection and tracking: event-based information organization. Kluwer Academic Publishers, 2002.

P.J. Denning. Electronic junk. Commun. ACM, 25(3): 163-165, 1982.

H.P. Luhn. A business intelligence system. IBM Journal of Research and Development, 2(4):314-319, 1958. ISSN 0018-8646.

D. Osman, J. Yearwood, and P. Vamplew. Automated opinion detection: Implications of the level of agreement between human raters. Inf. Process. Manage., 46(3):331-342, 2010.

C. Tryfonopoulos, M. Koubarakis amd Y. Drougas. Information filtering and query indexing for an information retrieval model. ACM Trans. Inf. Syst., 27(2):10:1-10:47, 2009.

* cited by examiner

400 China Launches 1st Female Astronaut and 2 Men to Space Lab

METHOD AND SYSTEM FOR DISPLAYING CONTENT RELATING TO A SUBJECT MATTER OF A DISPLAYED MEDIA PROGRAM

FIELD

The present disclosure relates to media programs, and more specifically to determining content (e.g., a news article) associated with a subject matter of a portion of a media program.

BACKGROUND

Watching television programs or other media programs is typically an enjoyable way to spend one's time. Recently, a new breed of applications for mobile devices (e.g., smartphones and tablets) have enhanced the television watching experience. These software applications (often referred to as "apps") may provide information related to the television program being watched, such as information about the actors and actresses in the program, information about the music being played in the television program, etc. These apps may also display comments or messages from other users who are watching the same television program and may allow you to respond to these messages or post your own message(s). IntoNow®, from Yahoo!®, Inc. is one such mobile device app.

SUMMARY

The present disclosure relates to a system and method for obtaining content relating to a subject matter of a portion of a media program and communicating this content to the user (e.g., for display) within a certain time period relating to when the subject matter was obtained.

In one aspect, a server computer analyzes closed captioning text associated with a media program (e.g., television program) being experienced (e.g., watched or listened to) by a user having a client device. The server computer obtains, based on the analyzing, a subject matter of a portion of the media program from the closed captioning text. The server computer constructs a query associated with the determined subject matter and submits the query to a computer network as a search query. The server computer receives, in response to the submitting of the query, content relating to the subject matter and measures an elapsed time period between the receiving of the content and the obtaining of the subject matter. If the elapsed time period is less than a predetermined period of time, the server computer communicates, to the client device, information related to the content. In one embodiment, the communicating of the information includes communicating one or more link to the content, a web page, or the content.

The obtaining of the subject matter can include identifying topics associated with the portion of the media program. The identifying of the topics can include defining a theme from segments of consecutive lines in the closed captioning text. In one embodiment, the defining of the theme includes defining a theme based on a sliding window scheme. The constructing of the query may include constructing the query out of consecutive lines in the closed captioning text. In one embodiment, entities are extracted from a plurality of documents. The documents may include news articles. The content may include a news article, and/or the subject matter may include a news story.

In one embodiment, documents in the content are ranked, and the documents ranked above a predetermined threshold (e.g., the top 2 documents) are communicated to the client device if the elapsed time period is less than a predetermined period of time.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
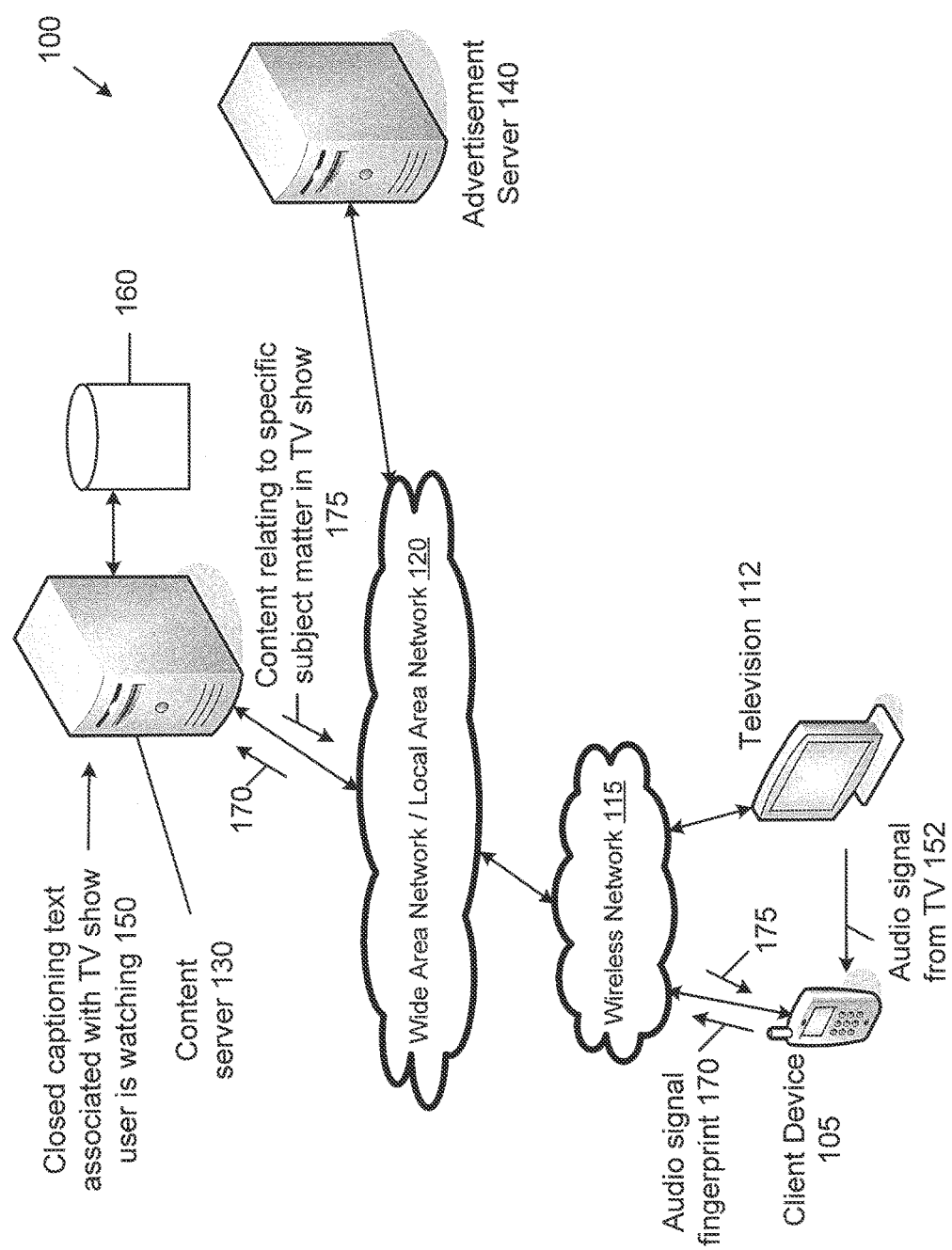
FIG. 1 is a schematic diagram illustrating an example system of a network and devices implementing embodiments of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 is a schematic diagram illustrating an example system 100 of a network and devices implementing embodiments of the present disclosure. Other embodiments that may vary, for example, in terms of arrangement or in terms of type of components, are also intended to be included within claimed subject matter. FIG. 1 includes, for example, a client device 105 in communication with a content server 130 over a wireless network 115 connected to a local area network (LAN)/wide area network (WAN) 120, such as the Internet. Content server 130 is also referred to below as server computer 130 or server 130. In one embodiment, the client device 105 is also in communication with an advertisement server 140. Although shown as a wireless network 115 and WAN/LAN 120, the client device 105 can communicate with servers 130, 140 via any type of network.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Examples of devices that may operate as a content server include desktop computers, multiprocessor systems, microprocessor-type or programmable consumer electronics, etc. Content server 130 may provide a variety of services that include, but are not limited to, web services, third-party services, audio services, video services, email services, instant messaging (IM) services, SMS services, MMS services, FTP services, voice over IP (VOIP) services, calendaring services, photo services, social media services, or the like. Examples of content may include text, images, audio, video, or the like, which may be processed in the form of physical signals, such as electrical signals, for example, or may be stored in memory, as physical states, for example. In one embodiment, the content server 130 hosts or is in communication with a database 160.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, subnetworks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

In one embodiment and as described herein, the client device 105 is a smartphone. In another embodiment, the client device 105 is a tablet. The client device 105 is, in one embodiment, in the same room as a television 112 (or other media player). Further, in another embodiment, the client device 105 is included in the television 112 itself (e.g., a smart TV), is a computer, a computer monitor, a radio, an ipod®, etc. Certain embodiments disclosed herein relate to the concept of "second screen" viewing, which is intended to describe the viewing of an item of media on one device while generally simultaneously interacting with another smart device that has "knowledge" of the media item being viewed.

Suppose a user of the client device 105 turns on the television 112 and begins experiencing (e.g., watching, listening to) a media program played on the television 112. In one embodiment, the server computer 130 obtains the closed captioning text 150 associated with the media program. This closed captioning text may be obtained via a broadcast by the television network(s). In another embodiment, the server computer 130 has previously received the closed captioning text and has stored the closed captioning text (e.g., in database 160 or other art recognized storage methodology), such as for example if the media program is a rerun and the closed captioning text was previously broadcasted by the network and/or received by the server 130. The media program may be, for example, a news program.

Figure 2:
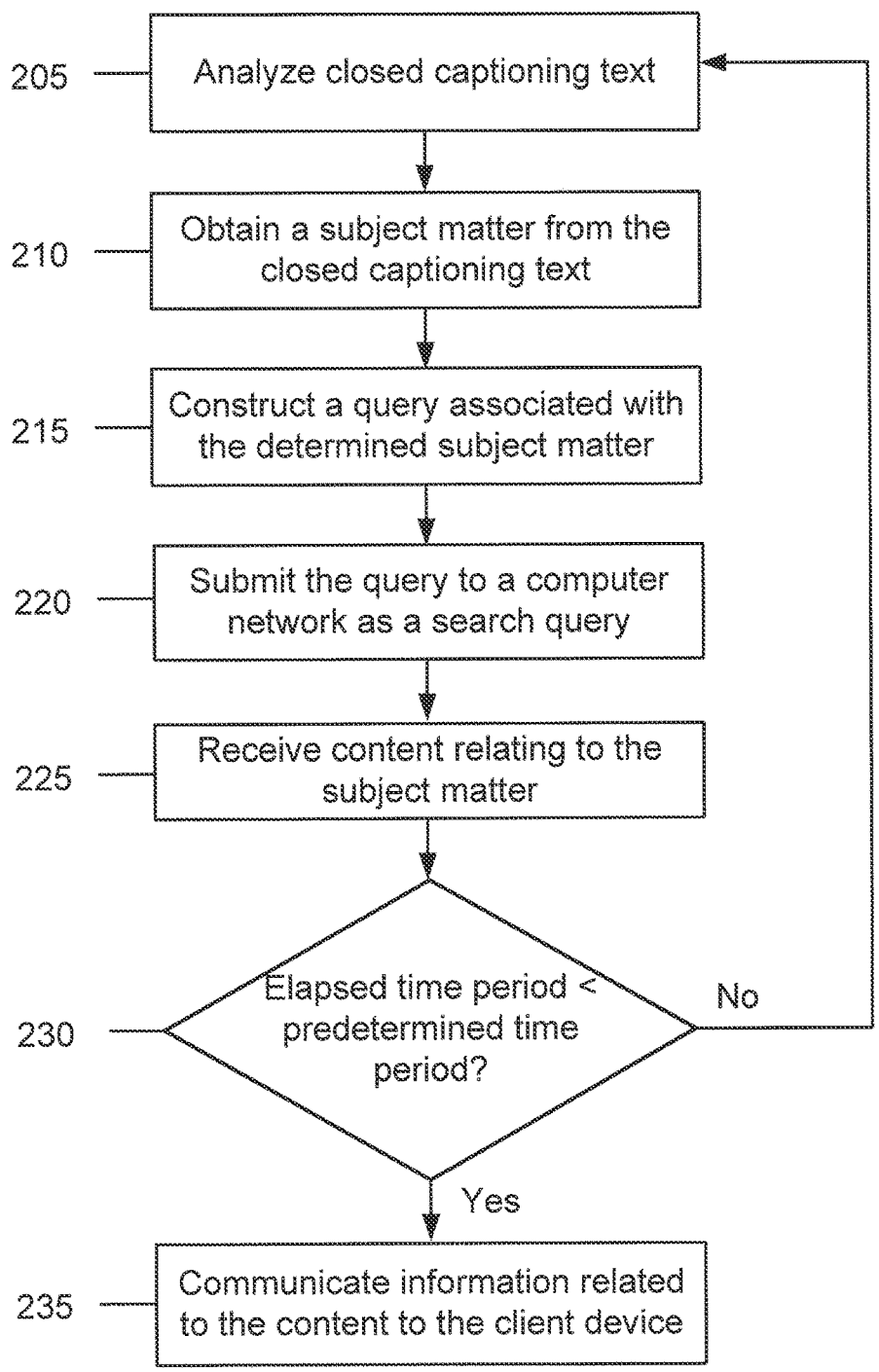
FIG. 2 is a flowchart illustrating steps performed by the server computer to provide information related to content associated with closed captioning text in accordance with an embodiment of the present disclosure.

Also referring to FIG. 2, the server 130 analyzes the closed captioning text associated with the media program (Step 205). In one embodiment, the server 130 parses the closed captioning text into sentences and identifies themes associated with one or more of the sentences. As described in more detail below, the server 130 obtains a subject matter (e.g., a specific news story) from the closed captioning text (Step 210). In one embodiment, the server 130 constructs a query associated with the determined subject matter (Step 215) and submits the query to a computer network (e.g., another computer, an intranet, the Internet, etc.) (Step 220). The server 130 receives content relating to the subject matter (Step 225). For example, the server 130 receives a news article relating to the specific news story discussed or displayed during the media program. In one embodiment, the server 130 determines an elapsed time period between the time the content was retrieved from the network and the time that the subject matter was obtained (Step 230). If this elapsed time is less than a predetermined period of time (e.g., the content is relevant to what was recently viewed or heard by the user), the server 130 communicates information related to the content 175 to the client device (e.g., for display) (Step 235). The information may be a link to a web page, a web page, a file, an article (e.g., a news article), audio, video, etc.

For example, suppose a user is watching a news program on the CBS Network® and also has his smartphone. In one embodiment, the user activates the IntoNow® app provided by Yahoo!®. In one embodiment, the IntoNow® app receives an audio signal 152 from television 112. The client device 105, (using the IntoNow® app, or another application or group of applications capable of performing the functions described herein) utilizes fingerprinting technology to determine which television program is playing on the television 112 from the audio signal 152. In one embodiment, the client device 105 transmits an audio signal fingerprint 170 to the server computer 130. The server computer 130 compares this audio signal fingerprint 170 to fingerprints in the database 160 to determine the television program being displayed on the television 112. Of course, other forms of program identification can be used, by way of non-limiting example through data exchange with a set-top box, or a smart video device like a networked television, reading program metadata, matching time and channel data to a program guide, or the like.

Once the television program is determined, the server 130 can obtain the closed captioning text associated with the program. The server 130 may have this closed captioning text already stored in its database or may obtain the closed captioning text from the subject's broadcast program. In another embodiment, the server 130 utilizes voice to text software to analyze the audio signal 152 and determine text associated with the media program.

By way of non-limiting example, suppose a news program is currently being broadcast and contains a weather report, delivered by an announcer, indicating that it is snowing in Washington, D.C. and the snow is expected to continue throughout the night. The server 130 analyzes the closed captioning text to determine this subject matter. In one embodiment, the server 130 obtains a subject matter of a portion of a media program by identifying topics or segments of consecutive lines in the closed captioning text that define a cohesive theme in the text. In one embodiment and as described in more detail below, a sliding window scheme is used to identify the topics.

The server 130 can then construct the query, such as by extracting terms from the closed captioning text or sequence of closed captioning lines that reflect the topic of the news being aired. The extracted query terms can be matched against a news collection of documents maintained in database 160 or some other storage device. In one embodiment and as described in more detail below, the server 130 extracts concepts or topics or subjects from a news article's contents. The server 130 can then leverage feedback from the search system in order to decide when the query would or would not be utilized to retrieve news articles. As described in more detail below, this decision could be based on Topic Change Detection.

By way of non-limiting example, the query may be "Snowing in Washington, D.C." The server 130 submits this query to one or more search engines or data repositories available via the Internet (e.g., Yahoo! Search) and obtains one or more results. In one embodiment, the server 130 ranks the relevance of each search result to the query (e.g., based on an analysis of the text of the search result(s) and the query, based on similarities between the search result(s) and the query, etc.). The results may include web pages, audio, videos, articles, etc. For example, a result may be a news article describing the snow storm hitting Washington, D.C. The server 130 determines, for example, that the time period between the determination that the newscaster is discussing the snow storm on television and the retrieval of this news article is 2 seconds. The server 130 may utilize a parameter corresponding to an acceptable amount of elapsed time between the obtaining of the subject matter from the closed captioning text and the delivering of a related news article (or other content). This parameter may be set to a default value or may be configurable by a user. If the elapsed time period is less than the threshold amount of elapsed time, the server 130 communicates information related to the content to the client device 105.

The server 130 then ranks documents in the collection for the query. The server 130 selects a predetermined number of results to show to the user (e.g., top-k results, where k is a number). This predetermined number k may be set to a default value or may be configured (e.g., by the user).

Users of a typical Information Retrieval (IR) system issue queries with the goal of retrieving a set of top-k relevant items from a collection of items, such as for example electronic documents. Therefore, three distinct moments in the typical IR process can be identified: (i) the user formulating the query and issuing it, (ii) the IR system processing the query and retrieving the top-k document, and (iii) the user checking a subset (typically smaller than k) of the resulting documents to satisfy their information needs.

Here, when using the system 100, the user does not formulate a query, rather the system implicitly formulates one for the user by using the content of the newscast airing. A query is formed by system 100 by observing a continuous stream of text without any indication on topic boundaries, keywords, important concepts or entities. Finally, the user receives a small set of results (typically ranging from one to five) that are continuously changing as new lines of closed captioning (CC) text arrive. The system 100 has to account for when a news item is displayed, as the system 100 cannot afford to show a relevant document after the end of the news currently airing. In other words, the system 100 evaluates the quality of the system with respect to being timely.

Figure 3:
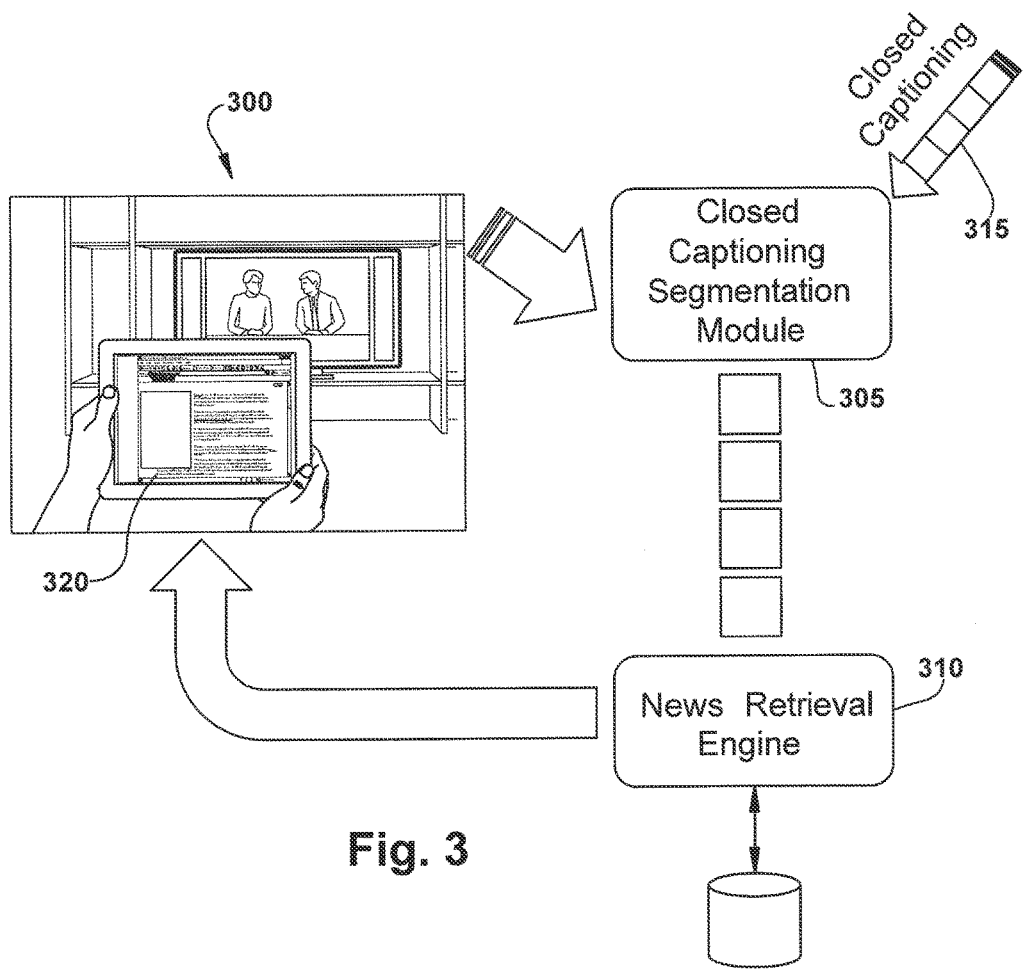
FIG. 3 is a system including a closed captioning segmentation module and a news retrieval engine in accordance with an embodiment of the present disclosure.

FIG. 3 illustrates a system 300 including a closed captioning segmentation module 305 and a news retrieval engine 310. The system 300 models the newscast as a series of contiguous segments, each matching a single cohesive topic. The CC segmentation module 305 finds the boundaries of these news segments in the stream of CC 315. The news retrieval engine 310 formulates a query given a segment.

Thus, system 300 performs stream-based news retrieval. This retrieval is different from traditional information filtering because a stream of documents (or queries) are not provided, but rather a stream of text (usually noisy) is provided from which queries have to be extracted and submitted. Also, timeliness directly impacts relevance.

In one embodiment, each line of CC 315 is associated with a monotonically increasing timestamp that indicates the time it was aired, and by replaying the CC 315 according to this timestamp, the original stream can be reproduced. The news retrieval engine 310 then outputs one or more news stories to a user's client device (e.g., tablet) 320.

In one embodiment, the news retrieval engine 310 obtains (e.g., receives or retrieves) a pool of news articles. The news retrieval engine 310 can extract and index entities and keywords in addition to the full text, treating each separate field (e.g., title, body) differently. In one embodiment, to process the articles, software programs such as OpenNLP® (e.g., for tokenization, sentence splitting and part-of-speech tagging) and SuperSense Tagger® can be used (e.g., for named entity recognition).

In one embodiment, a ground truth can be built for the CC segments. The news retrieval engine 310 may depend on how the stream of text is segmented. In one embodiment, the stream of CC lines is segmented into coherent pieces of texts that speak about the same topic. In one embodiment, a topic is defined as an event concerning a single subject. As an example, consider the following fragment of text:

>>> a new celebrity caught up in the chris brown/drake bar fight. tony parker says he suffered a scratched retina in the fight and now has to put off training with the french olympic basketball team. also new, the new york city club where the fight started has been shut down. police say eight people were injured, including singer chris brown. witnesses told officers the fight started when drake's entourage confronted brown as he was leaving the club.

The text speaks about a bar fight between singers Chris Brown and Drake, in which professional basketball player Tony Parker suffered a scratched retina. Because of the fight, the club was shut down. In this case, the CC segmentation module 305 classifies the text as belonging to a single topic with a single subject, the fight. A finer segmentation could have divided the fragment above into two different subjects. The first subject could be Parker's injuries and the second subject could be the causes and effects of the fight at the club.

TABLE 1

Ground truth dataset characteristics.

| | |
|---|---|
| Number of lines | ≈36k |
| Number of segments | 720 |
| Avg. No. of words per segment | ≈280 |
| Avg. segment duration | ≈97 s |

TABLE 1-continued

Ground truth dataset characteristics.

| Avg. No. of relevant news per segment | ≈5.3 |
| No. of news articles | ≈180k |

Next, the news retrieval engine 310 determines matching news in the pool of articles. Given the size of the document collection and as described in more detail below, queries for each segment were created and submitted to an internal search facility to retrieve a set of candidate news articles.

As an example of a segment-news pair, consider the following text:

>>> a giant leap for china. a chinese spacecraft successfully docked with a orbiting space laboratory this morning. this makes china to complete a manned space docking behind the united states and russia. the mission also sent the country's first female astronaut into space.

Figure 4:
FIG. 4 is a news article considered to be a match to the closed captioning text in accordance with an embodiment of the present disclosure.
Figure 5:
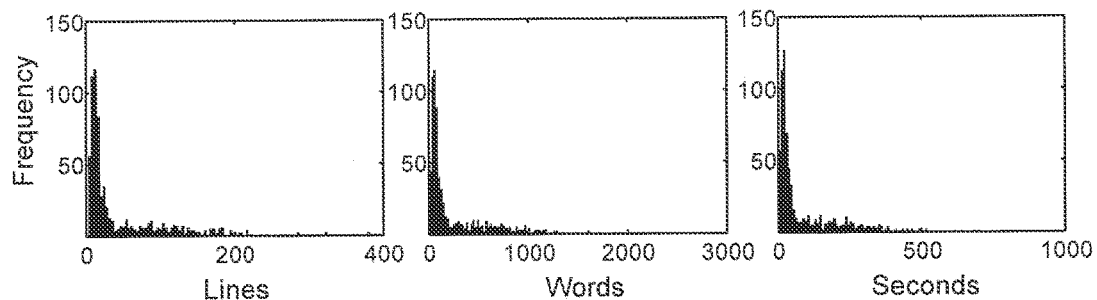
FIG. 5 depicts a graph of a distribution of segment lengths measured in number of lines, words and seconds in accordance with an embodiment of the present disclosure.

FIG. 4 shows a news article 400 considered to be a match (e.g., by assessors or by the news retrieval engine 310). Table 1 above depicts the characteristics of the dataset produced by the process outlined above. FIG. 5 depicts a graph 500 of the distribution of segment lengths measured in number of lines, words and seconds. The distribution is skewed and heavily tailed. Many segments are of short length, but a significant fraction is much longer than the average.

In one embodiment, the primary input data is represented by an unbounded stream of CC text $C=\langle c_1, c_2, \ldots \rangle$. Each CC item $c=(t,l)$ is composed by a timestamp $t \in T$ and a short piece of text $l$, which contains one or more words $w$. The timestamp $t$ increases monotonically in the stream, and represents the time at which the CC text is available to our system, i.e., $c_i < c_j \Leftrightarrow t_i < t_j$.

In one embodiment, at any given time, the assumption is made that there exists a finite number of topics $N$, which represent noteworthy news events. It is further assumed in one embodiment that the existence of a function $L_{cc}: C \rightarrow N$ that maps each line of CC in the stream C to a topic $n \in N$. In one embodiment, the system does not have access to the function $L_{cc}$.

A secondary input is a collection of documents D. The documents can have any arbitrary format and the assumption is made that they can be indexed and searched via an underlying IR engine. Similarly, to cc lines, it is assumed that each document $d \in D$ can be mapped to a topic $n \in N$ by a function $L_D: D \rightarrow N$. Also, in this embodiment, the system has no access to this function. In practice, there may exist documents in the collection that refer to topics outside N. In one embodiment, these documents are irrelevant and may be ignored.

By way of a non-limiting example, assume an input is provided in the form of an unbounded stream of closed caption lines C and a collection of documents D. In one embodiment, assume the existence of a set of topics N, and two functions $L_{cc}$ and $L_D$, that map, respectively, closed caption lines and documents to topics. One task to be performed, in an embodiment, is to find, $\forall c \in C, k$ documents $R^k \subset D$ such that $L_{cc}(c)=L_D(d)$, $\forall d \in R^k$.

Note that the topics do not typically need to be identified and the topic functions L do not typically need to be approximated. Instead, the process is to find matching documents for each line of CC, or equivalently, for each timestamp t.

An optimization objective does not need to be defined, and instead the process states the characterization of an ideal solution. Evaluation is described below. In one embodiment, the following occurs: (i) there is no access either to the topics N or to the functions L, and (ii) the input stream is seen line by line (i.e., the solution involves an online algorithm). In practice, the system 300 needs to deal with unspecified topics that might include loose boundaries, and make point-wise decisions based on local information.

As previously described, in one embodiment an IR approach is taken. In order to employ traditional IR techniques, the system finds ranked lists of documents rather than sets; with abuse of notation, a ranked list of k documents is denoted with $R^k$. Therefore, the system 300 can be regarded as a function $f_{sol}^D: C \rightarrow \{D^k\}$ that matches a document list $R_i^k$ to each CC line $c_i \in C$, while optimizing a relevance function (as described below).

In one embodiment, topics arrive in segments in the stream, where the (contiguous) lines of the segment belong to the same topic. Rather than trying to match a set of news to each CC line, in one embodiment the boundaries between two different topics in the stream are found. This way, the goal becomes to detect the boundaries of the topics as soon as possible, and therefore minimize the duration of the topic mismatch between C and $R^k$.

Three different components can be identified. First, the system 300 has to identify topics, i.e., segments of consecutive lines in C that define a cohesive theme in the text. This can be thought of as identifying a set of points in time $(t_1, t_2)$ that bound the topic: $f_{seg}^D: C \rightarrow \{T \times T\}$. Note that these bounds implicitly define a sequence of CC lines: $S=\{(t_i, l_i) | t_1 \leq t_i < t_2\}$. Second, a query needs to be constructed out of the sequence of lines that represent efficiently the topic, and that can be matched against the document collection: $f_q^D: S \rightarrow S$. Note that we are using a words-only representation, but more generally S could be comprised of different units, possibly capturing higher order semantics (for instance named entities). In its simplest form, $f_q$ (to simplify the notation, the dependence on D for functions is omitted below) could be the identity function, using the text in the topic, but, as described below, there are some benefits from more compact representations of the query. Lastly, the system 300 needs to rank documents in the collection for the query: $f_{rank}^D: S \rightarrow \{D\}$. The former function ($f_{seg}$) represents the closed caption segmentation component of FIG. 3, while the latter two functions ($f_q$ and $f_{rank}$) in conjunction represent the news retrieval engine 310.

Given that news items have to be displayed as soon as possible, $f_{seg}$ produces a query that can retrieve matching documents for the segment, and is minimal, e.g., there is no other shorter prefix of words that is able to retrieve more relevant documents.

Thus, as stated above, the process can include two sub-processes. The first one consists of selecting a segment of CC text such that a retrieval oracle $O_R$ would be able to retrieve the corresponding matching documents for the topic. This is referred to below as segmentation. The oracle of the previous process is just a conceptual tool, therefore an effective retrieval method has to be designed. Given an optimal solution to the segmentation (i.e., a segment that corresponds to a single topic n) provided by a segmentation oracle, the retrieval method should return documents associated with the same topic n. This is referred to below as "news retrieval".

To get to the final solution $f_{sol}$, the two functions can be optimized separately as if they were independent. However, as described below, the functions may also leverage feedback of the news retrieval engine to decide on segment boundaries.

Segmentation

The system 300 is presented with a continuous stream of CC lines. Each line is added to a buffer B that is meant for building the query for the oracle $O_R$. Several strategies are available for managing B and thus implement $f_{seg}$.

One strategy is to use a windowed approach to build candidate segments. A given size can be fixed for B and the window can be moved along the stream C. In one embodiment, two different fixed-size variants of the windowing approach are described: (i) a "sliding window approach" ($SW_\Gamma$), and (ii) a "tumbling window" approach ($TW_\Gamma$). The parameter $\Gamma$ is the size of the window in seconds. $SW_\Gamma$ trims the oldest CC line from B when its size exceeds $\Gamma$, and therefore builds a new candidate segment of maximum duration $\Gamma$ for each new CC line in the stream. $TW_\Gamma$ builds adjacent windows of fixed size $\Gamma$, that is, a new candidate segment is proposed and B is cleaned whenever a line is added to B that would make it exceed $\Gamma$, and therefore a candidate segment is proposed every $\Gamma$ seconds at most.

Formally, the $f_{seg}$ functions implemented by the two windowing approaches are the following.

$$f_{seg}(S; \Gamma) = sw_\Gamma$$
$$= \{(t_i, t_j) \mid t_j - t_i = \Gamma\}$$
$$f_{seg}(S; \Gamma) = tw_\Gamma = \{(t_i, t_j) \mid t_i = k \cdot \Gamma, t_j = t_i + \Gamma, k \in \mathbb{N}\}$$

The main motivations to choose these windowing approaches are that they are computationally inexpensive and simple to implement. Furthermore, they perform well in practice, especially when combined with other methods for generating discriminative queries and retrieving results.

News Retrieval

Consider $f_{rank}$ to employ BM25F (as described below). When "underlying IR system" is used herein, BM25F is considered as the retrieval model used. In information retrieval, BM25 is a ranking function used by search engines to rank matching documents according to their relevance to a given search query. BM25, and its newer variants, e.g. BM25F (a version of BM25 that can take document structure and anchor text into account), represent TF-IDF-like retrieval functions used in document retrieval, such as Web search.

Once the buffer B has been built by $f_{seg}$, the news associated with it needs to be retrieved. A naive implementation of $f_q$ is the identity function. However, this kind of query typically turns out to be too noisy and lengthy for most of the segments in the dataset. Furthermore, the processing time needed for a very long query could be of hindrance for a real-time retrieval application.

In one embodiment, B is transformed into a more effective and efficiently processable query. In order to do so, the buffer B can be reduced to a more compact version $\tilde{B}$ considerably shorter in length but maintaining the same amount of expressiveness. A term selection strategy is adopted based on the popular TF-IDF heuristic, where the term frequency is computed in the buffer B, while the inverse document frequency is computed from the document collection D. The main goal is to select a subset of the top-k most discriminant terms and submit to $f_{rank}$, where k is a parameter of $f_q$.

Topic Change Detection

Another related issue is when to issue a new query to the underlying search engine from the candidate set of queries that are being continuously generated. One option is to issue each and every query, and this variant is referred to as plain TF-IDF.

One technique involves attempting to detect when the topic in the segment has changed, i.e., detecting the topic boundaries within the stream. This modus operandi is referred to as Topic Change Detection (TCD). Formally, a TCD scheme is a function $f_q$ that returns a new buffer $\tilde{B}$ only if it detects a topic change, otherwise it returns the same buffer B returned at the previous invocation.

There are a number of strategies to implement a TCD scheme, ranging from Natural Language Processing to Machine Learning. However, an IR approach is described below.

Given the underlying IR engine, it is leveraged for feedback. The TCD schemes query underlying IR engine with the current candidate query, and decides on whether there has been a topic change by analyzing the results of the query. If the result set has changed considerably from the results of the last submitted query, the scheme detects a topic change and returns the new query.

Three different variants of TCD that use different ways of measuring change are proposed in the result set: Result Jaccard Overlap (RJO), Entity Jaccard Overlap (EJO) and Entity Jensen-Shannon Divergence (EJS). The strategies measure the distance between the candidate query and the last returned query, and are parameterized by a threshold $\theta \in [0,1]$ that determines their sensitivity.

RJO measures the topic distance by the Jaccard overlap between the result sets of the queries. In this case, each news article in the result list is considered as an item in a set. It detects a topic change when the overlap between the sets falls below the threshold.

EJO measures the topic distance by the Jaccard overlap between the sets of entities extracted from results of the queries. This method builds a set from the entities extracted by each news article in the result list. As described with respect to the previous method, it detects a topic change when the overlap falls below the threshold.

EJS measures the topic distance by the JS divergence between the distributions of entities extracted from results of the queries. This method computes the distribution of entities extracted from the news articles in the result list. In this case, it detects a topic change when the divergence is over the threshold.

Quality Assessment

The function defined above bears some resemblance to information filtering, recommender systems and traditional information retrieval. In fact, the result of the system is a ranked list of news likely matching the one currently announced by the speaker of the newscast. Furthermore, as already highlighted in the previous sections, time plays an important role in the application scenario.

Given these requirements, the solution is quantified to the process with a utility function $\phi(S,f) \to \mathbb{R}$ that measures the relevance of a ranked list of documents for a given segment S. The function can then be seen as optimizing the utility function $\phi$:

$$fsol = \underset{f \in F}{\operatorname{argmax}} \phi(S, f(c)),$$
$$\forall c = (t, l) \in S,$$

where F is the space of possible functions. In the remainder of this section, considerations for $\phi$ are described for a single segment S, and assume the evaluation is performed on average across all segments. For simplicity of notation, the boundaries of the segment S are assumed to be [0,Γ].

To correctly evaluate the system, two conflicting goals are taken into account: on the one hand, news items relevant for the topic of the current segment should be provided, and on the other hand, these matchings should be provided as soon as possible. Providing results sooner means having less data at disposal to create a query for the topic of the current segment, which in turn can introduce noise and degrade relevance performance. Conversely, providing relevant results only when the current CC segment is over is of little value to the user of the application since by then the topic has already changed. The evaluation function ϕ needs to capture this trade-off.

Time-based relevance. The value of a match for a single segment depends on two factors: its relevance and the duration for which it is displayed on the screen of the user. For this reason, the relevance of a news match for a segment is defined to be the integral of its point-wise relevance:

$$\phi(S,f) = \int_0^\Gamma v(f(t,l)) dt$$

where $v(\cdot)$ measures the value of a single ranked list of documents $R^k$ for the segment S, independent of time.

However, the notion that a match given at an earlier time is more valuable than the same match given at a later time should be captured. Therefore, a convolution with a time discount function $\psi(t)$ is used.

$$\phi(S,f) = \int_0^\Gamma v(f(t,l)) \psi(t) dt$$

The time discount function $\psi(t)$ is a positive, monotonically non-increasing function with values between zero and one, that is, it has the following characteristics:

$\psi(0) = 1$
$\psi(t) \geq 0, \forall t$ $$\frac{d}{dt}\psi(t) \leq 0, \forall t$$

Given that there are different segment durations, a family of functions parameterized by Γ is desired, and an additional constraint is added:

$$\psi(\Gamma) \leq \epsilon, \epsilon \ll 1 \quad (1)$$

The results provided by the system change at discrete times, so the integral can be transformed into a discrete sum:

$$\phi(S,f) = \Sigma_{i=0}^N v_i(R_i^k) \psi_\Gamma(t_i)$$

where $R_i^k = f(t_i, l_i)$ is i-th results list $R_i^k$ provided by the system, and ti is the time at which it is provided.

Different options for the functions $\psi_\Gamma(t)$ and $v(\cdot)$ exist. For the time discount function $\psi_\Gamma(t)$, four different functions may be used. All functions are defined for $t < \Gamma$ and are zero elsewhere:

Step: $\psi_\Gamma(t) = \text{sgn}(\Gamma - t)$

Linear: $\psi_\Gamma(t) = 1 - t/\Gamma$

Figure 6:
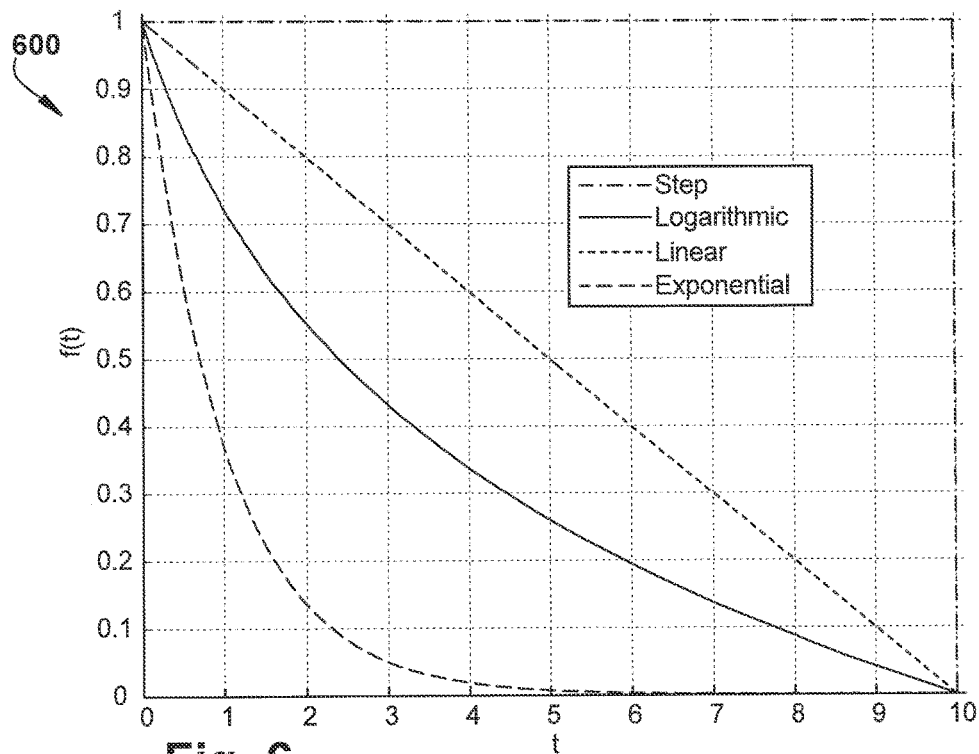
FIG. 6 depicts a visual representation of time discount functions in accordance with an embodiment of the present disclosure.

Logarithmic: $\psi_\Gamma(t) = 1 - \log_\Gamma\left(1 + t \times \frac{\Gamma - 1}{\Gamma}\right)$ Exponential: $\psi_\Gamma(t) = e^{-t\frac{10}{\Gamma}}$ FIG. 6 depicts a visual representation 600 of the various functions defined for Γ=10. Note that given that the area below each curve is different, values computed with different time discount functions are not directly comparable.

A Mean Average Precision (MAP) is used as the main measure for the value function $v(\cdot)$. The use of a measure based on Normalized Discounted Cumulative Gain (NDCG) is explored to make use of unjudged results.

NDCG.

The NDCG measure is used in order to work around the limited size of the human judgements available from the ground truth. Rather than having binary relevance judgements, 5 levels of relevance are considered, from 0 to 4. The goal is to compute a relevance value for any news article (even unjudged ones) for a given segment.

Keywords and entities are used in the news article as a proxy for its content and the procedure is bootstrapped by using the ground truth. For each segment, the news articles judged relevant by human assessors are taken, and a set of their keywords are built. This set is referred to as the relevant keyword set ($RK_S$) for the segment S. Then, the relevance of a news article n is defined with keywords $K_n$, for a segment S as:

$$Rel(n, S) = \left\lceil \frac{|K_n \cap RK_S|}{|K_n|} \times 5 \right\rceil$$

That is, the value of Rel(n,S) is binned in 5 levels (0.2, 0.4, 0.6, 0.8, 1.0) according to the faction of entities in the news that are also in the relevant keyword set, and value 0 to 4 is assigned to each level. Finally, NDCG is computed for the result list with the relevance values computed as described above.

Coverage.

Sometimes the system is not able to provide suggestions in time, mostly because the segment is too short or because the system misses the change in topic. For this reason, the system is assessed in terms of how many segments have at least one suggestion. Coverage is defined to be the fraction of segments in the ground truth for which at least one matching is provided. The suggestion ratio is also assessed, the number of different results provided for each segment in the ground truth. The suggestion ratio provides an estimate of the overhead of the method.

Solution Examples

In order to evaluate the system, the variants described above are analyzed, and the effects of the window size parameter Γ and of the TCD threshold parameter θ are explored. The ranking model is tuned in a separate validation set (this is, setting weights for keywords, entities, title and body) and the parameter values of BM25F are fixed, given that the ranking function is not the main focus. Similarly, k=10 is used as the parameter for TF-IDF (number of terms per query). The underlying IR engine used in one embodiment is Apache Solr, modified to adopt the BM25F model, and the top-100 results are retrieved.

TABLE 2

Linear MAP score of sliding vs. tumbling window.

| Variant | $SW_\Gamma$ | $TW_\Gamma$ | Γ |
|---|---|---|---|
| TF-IDF | 0.195 | 0.185 | 10 |
| $EJO_{0.2}$ | 0.172 | 0.145 | |
| $EJS_{0.8}$ | 0.195 | 0.185 | |

TABLE 2-continued

Linear MAP score of sliding vs. tumbling window.

| Variant | $SW_\Gamma$ | $TW_\Gamma$ | $\Gamma$ |
|---|---|---|---|
| $RJO_{0.2}$ | 0.183 | 0.183 | |
| TF-IDF | 0.251 | 0.208 | 30 |
| $EJO_{0.2}$ | 0.307 | 0.217 | |
| $EJS_{0.8}$ | 0.252 | 0.208 | |
| $RJO_{0.2}$ | 0.240 | 0.205 | |
| TF-IDF | 0.253 | 0.195 | 60 |
| $EJO_{0.2}$ | 0.175 | 0.066 | |
| $EJS_{0.8}$ | 0.261 | 0.195 | |
| $RJO_{0.2}$ | 0.256 | 0.187 | |

TABLE 3

Linear MAP score of TCD variants.

| Variant | First | Linear |
|---|---|---|
| $SW_{10}$-TF-IDF | 0.108 | 0.195 |
| $SW_{60}$-TF-IDF | 0.064 | 0.253 |
| $SW_{30}$-$EJO_{0.2}$ | 0.593 | 0.307 |
| $SW_{10}$-$EJS_{0.2}$ | 0.116 | 0.194 |
| $SW_{60}$-$EJS_{0.2}$ | 0.101 | 0.262 |
| $SW_{30}$-$RJO_{0.2}$ | 0.296 | 0.240 |
| $SW_{60}$-$RJO_{0.8}$ | 0.099 | 0.260 |

TABLE 4

Coverage analysis.

| Variant | Coverage | Suggestion ratio |
|---|---|---|
| $SW_{30}$-$EJO_{0.2}$ | 0.135 | 0.150 |
| $SW_{30}$-$EJO_{0.4}$ | 0.489 | 0.863 |
| $SW_{30}$-$EJO_{0.6}$ | 0.829 | 3.440 |
| $SW_{30}$-$EJO_{0.8}$ | 0.933 | 6.818 |
| $SW_{30}$-$RJO_{0.2}$ | 0.933 | 6.568 |
| $SW_{30}$-$RJO_{0.4}$ | 0.981 | 13.133 |
| $SW_{30}$-$RJO_{0.6}$ | 0.994 | 19.861 |
| $SW_{30}$-$RJO_{0.8}$ | 0.999 | 24.149 |
| $SW_{30}$-TF-IDF | 1 | 39.153 |

TABLE 5

Performance with different time functions

| Variant | Step ↓ | Linear ↓ | Log. ↑ | Exp. ↑ | First ↑ |
|---|---|---|---|---|---|
| $SW_{30}$-$EJO_{0.2}$ | 0.419 | 0.307 | 0.083 | 0.124 | 0.593 |
| $SW_{30}$-$EJO_{0.4}$ | 0.479 | 0.295 | 0.058 | 0.074 | 0.565 |
| $SW_{30}$-$EJO_{0.6}$ | 0.464 | 0.260 | 0.047 | 0.056 | 0.373 |
| $SW_{30}$-$EJO_{0.8}$ | 0.482 | 0.259 | 0.045 | 0.052 | 0.274 |
| $SW_{30}$-$RJO_{0.2}$ | 0.422 | 0.240 | 0.050 | 0.062 | 0.296 |
| $SW_{30}$-$RJO_{0.4}$ | 0.447 | 0.242 | 0.044 | 0.056 | 0.210 |
| $SW_{30}$-$RJO_{0.6}$ | 0.468 | 0.245 | 0.043 | 0.052 | 0.147 |
| $SW_{30}$-$RJO_{0.8}$ | 0.491 | 0.252 | 0.043 | 0.050 | 0.109 |
| $SW_{30}$-TF-IDF | 0.500 | 0.251 | 0.043 | 0.049 | 0.079 |

Given the constraint in Eq. 1 for the time function $\psi_\Gamma(t)$, a system that uses a segmentation oracle (ORACLE) gets a value close to zero on any evaluation function. Indeed, the MAP ORACLE selects the words that compose the query for the IR system from the words in the segment, and thus cannot possibly submit the query before all the words in the segment have appeared, i.e., $t=\Gamma$ and, consequently, the segment is already over. Nevertheless, the result obtained by the ORACLE is used as an upper bound on the performance of the retrieval scheme. In the rest of the section, results are normalized with respect to the MAP score obtained by the oracle, i.e., 0.658.

Segmentation Strategies.

The two segmentation methods, the tumbling window approach (TW) and the sliding window approach (SW), are compared. For sake of clarity, Table 2 shows results only for the linear time function given that all the other measures show the same pattern. The analysis proves that the sliding window approach gets better results across various window sizes $\Gamma$ and across most TCD variants. The reason behind this result is that SW does not discard text and is thus more likely to detect the correct segment boundary. Table 2 also shows that larger values of $\Gamma$ lead to larger differences in terms of objective function between the two approaches. Therefore, the results obtained with SW are highlighted.

Topic Change Detection.

The effectiveness of the Topic Change Detection (TCD) techniques are evaluated compared with the naïve TF-IDF scheme. Table 3 shows the best variant for each TCD scheme obtained for different values of θ and $\Gamma$ and compares it to the plain TF-IDF. Two result are shown for each variant, the one with the highest First MAP to assess the detection of topic change, and the highest Linear MAP as a global quality indicator. First MAP measures the Mean Average Precision by evaluating only the first new match $R^k$ for each segment, that is, it evaluates the behavior of the algorithm near the boundaries.

The EJO variant obtains results as high as 60% of the ORACLE. Surprisingly, this variant has the highest MAP value for both categories. However, as shown below, such a high precision typically comes at the expense of coverage. The EJS variant seems to be performing not very differently from plain TF-IDF. Given that the EJO uses entities as well, in one embodiment the cause is the different way by which they measure topic distance. Our hypothesis is that by using a multi-set measure (JS divergence) rather than a set measure (Jaccard overlap), the results get influenced by repetitions of similar articles in the result list and this decreases the detection performance. The RJO variant seems to perform well compared to TF-IDF. As expected, using larger windows increase the overall performance at the expense of responsiveness in detecting the topic change. In fact, the methods with higher Linear MAP score apart from EJO have a large window size $\Gamma=60$. As with many other real-time applications, there is a tradeoff between being responsive and filtering out noise.

Coverage Analysis.

Table 4 shows the coverage and suggestion ratio for several methods. Ideally, both measures are as close to one as possible, as this would mean that the segment was identified exactly. There is a trade-off involved. By being too conservative, as in the case of the EJO strategy, high precision and low overhead is obtained but low coverage is obtained as well. On the other hand, TF-IDF obtains perfect coverage but at the expense of a very high suggestion ratio of nearly forty.

For the TCD methods, it is possible to tune the similarity threshold in order to get the desired coverage trade-off. The EJO method seems more sensitive to its parameter, compared to RJO. In any case, it is possible to achieve a coverage around 90% with a number of suggestion ratio as low as seven.

Time Functions.

The relative performance of the different variants depends on the time discount function in use. Table 5 shows MAP scores for all time discount functions for EJO and RJO with different values of the threshold θ. For reference, the value for the TF-IDF variant is also depicted. By increasing the threshold, the algorithm becomes more aggressive (i.e., only very similar text is considered belonging to the same topic). While the Step and Linear scores increase with the parameter, the Logarithmic and Exponential scores decrease with it.

A more aggressive topic detection suffers from high noise levels at segment boundaries, when transitioning from one topic to the next. At these points, submitting a query does not occur until most of the window overlaps with the new segment to get accurate results. Segment boundaries are also the most profitable regions for the Logarithmic and Exponential functions, thus these functions favor obtaining a correct result right at the onset of a segment. On the other hand, a more aggressive topic detection is able to recover faster from incorrect guesses made at the beginning. Therefore, the Step and Linear functions have higher values for larger θ.

In one embodiment, the First MAP score is also shown, which is computed by taking into account the first suggestion per segment in the ground truth. Results are shown in the rightmost column in Table 5. Note that this score is raw, i.e., not weighted by any time function, although it is evident that less aggressive topic detection performs as much as three times better.

Additionally, Table 5 shows how a more aggressive topic detection tends, in the limit, to the same behavior as TF-IDF (arrows show the direction of increase). Note that MAP values weighed with different time discount functions are not directly comparable to each other, because of the difference in the area below each curve (i.e. their integral). For Linear, EJO is an exception, but this result is influenced by variation in coverage of the method due to its sensitivity to 0.

Γ and θ.

Figure 7:
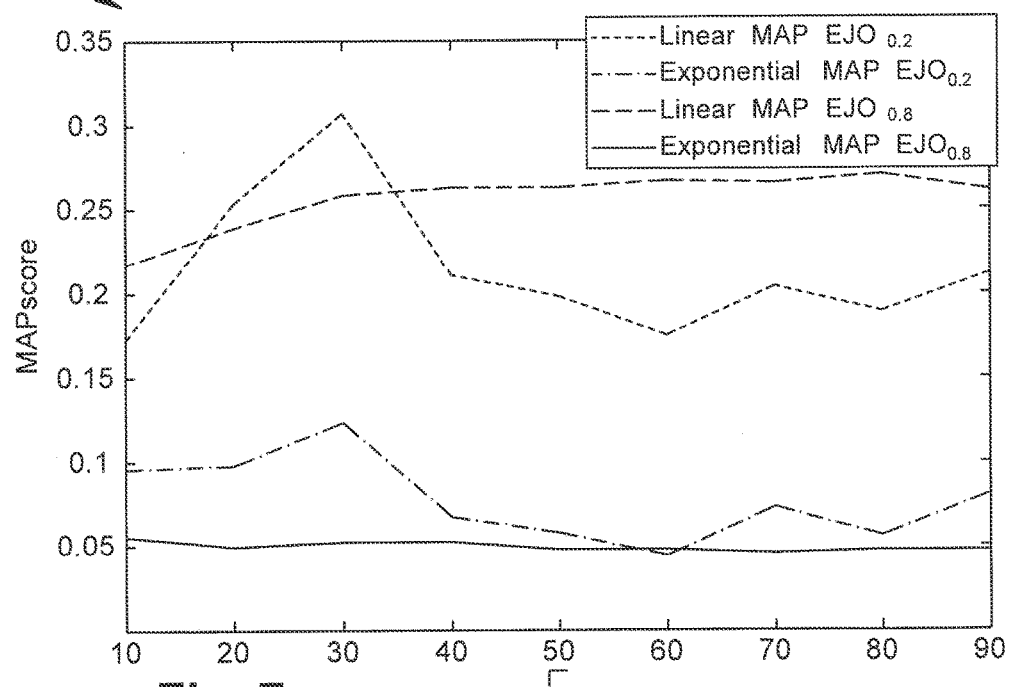
FIG. 7 depicts a graph indicating how the window size and the TCD threshold θ interact with each other in accordance with an embodiment of the present disclosure.

FIG. 7 depicts a graph 700 indicating how the window size Γ and the TCD threshold θ interact with each other. The Linear and Exponential MAP scores are plotted for EJO with two values for the threshold (θ=0.2 and θ=0.8) while varying Γ from zero to 90 seconds. When using a more aggressive threshold (0.8), the MAP score is far less sensitive to variations of Γ.

This behavior derives from the fact that with a less aggressive threshold, less queries are fired, thus the content of the buffer B can change considerably between two consecutive queries. Therefore the size of the buffer has a greater influence on the content of the query, and thus on the results. With a more aggressive threshold, the method fires more queries, and thus the content of B is often largely overlapping between two consecutive queries. Therefore, the size of the buffer becomes less relevant. From the figure, Γ=30 is, in one embodiment, an optimal value for EJO when using a threshold θ=0.2.

Figure 8:
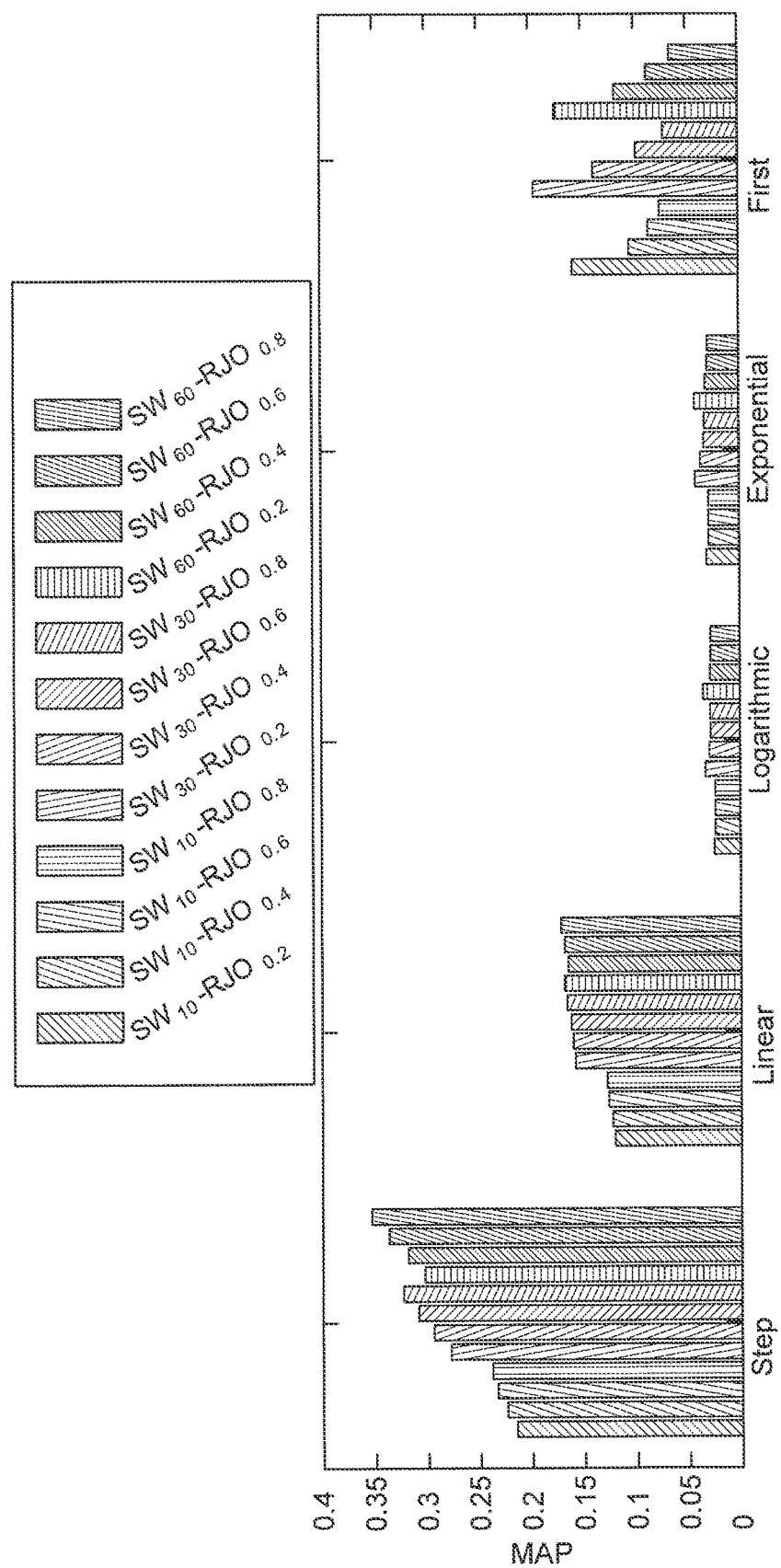
FIG. 8 depicts a graph indicating the combined effects of enlarging the window size and using a more aggressive TCD threshold in accordance with an embodiment of the present disclosure.

FIG. 8 depicts a graph 800 indicating the combined effects of enlarging the window size and using a more aggressive TCD threshold. While Linear and Step value increase, in one embodiment Logarithmic and Exponential value decrease. In one embodiment, a comparison of the methods occurs because the methods reach a coverage higher than 0.933. The cause of this behavior is shown in the rightmost group, where the First MAP score is plotted.

NDCG.

Figure 9:
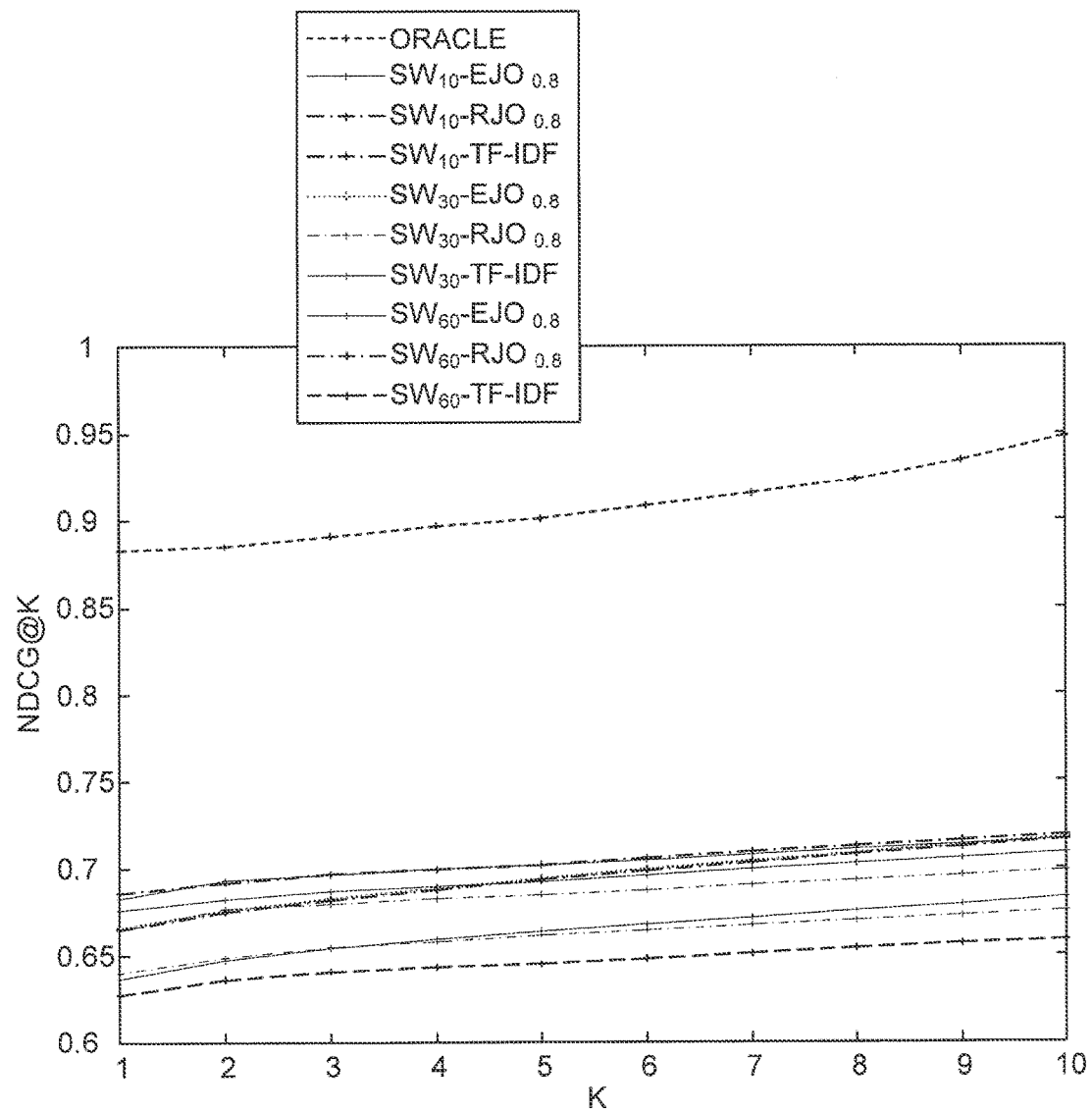
FIG. 9 depicts a graph indicating the NDCG values for a representative sample of variants in accordance with an embodiment of the present disclosure.

FIG. 9 depicts a graph 900 indicating the NDCG values for a representative sample of the variants. In one embodiment, the results obtained by using the Step time function are depicted. The best variants achieve a value of 0.70 while the ORACLE gets up to 0.95. For the ORACLE, this result indicates that the results are quite consistent and there are few outliers. On the other hand, the best variants achieve a value as high as 70% of the ideal one when suggesting related news.

In described embodiments, the variants are quite close to each other in result, so one or more such variants may be applied to the systems, methods, and functions disclosed herein. This suggests that the system is able to find a large fraction of related news for most of the segments, and this behavior is consistent across different variants and parameters.

Results Discussion

Analysis performed using a ground truth dataset built on real-world data coming from the IntoNow® platform and from Yahoo! News is discussed further below. Retrieving news from a corpus matching spoken text is a process different from traditional retrieval. The major difference is that a relevant result (i.e., a matching news page) is irrelevant if provided too late from when the speaker started to speak about the topic. The process can be modeled as two separate (but interdependent) subtasks—1) segmentation and 2) news retrieval, as described above. One segmentation technique is to adopt a fixed-width Sliding Window over the text stream, from which queries are extracted by the news retrieval phase. In one embodiment, queries are created using a TF-IDF strategy to extract relevant terms from the text within the window.

One strategy for determining whether to submit the query and show the results to the user is based on EJO (Entity Jaccard Overlap). The quality of retrieved results is evaluated for CC segments by means of a purposefully created dataset. If a goal is coverage, then an embodiment is a sliding window of 30 seconds over the stream of CC text with a RJO query firing strategy when 40% overlap between new query and old results is detected, i.e., $SW_{30}$–$EJO_{0.2}$. In fact, this strategy has a high coverage (more than 98%) with a relatively low suggestion ratio (i.e., about 13.1 suggestions per chunk) and a high MAP score. On the other hand, if a goal is obtaining a high precision figure at the cost of a low coverage, then a strategy is $SW_{30}$–$EJO_{0.2}$ obtaining a 0.135 coverage with a very low suggestion ratio of 0.15 (i.e., approx. 87 times smaller) and a high quality in terms of linear MAP of 0.307.

Figure 10:
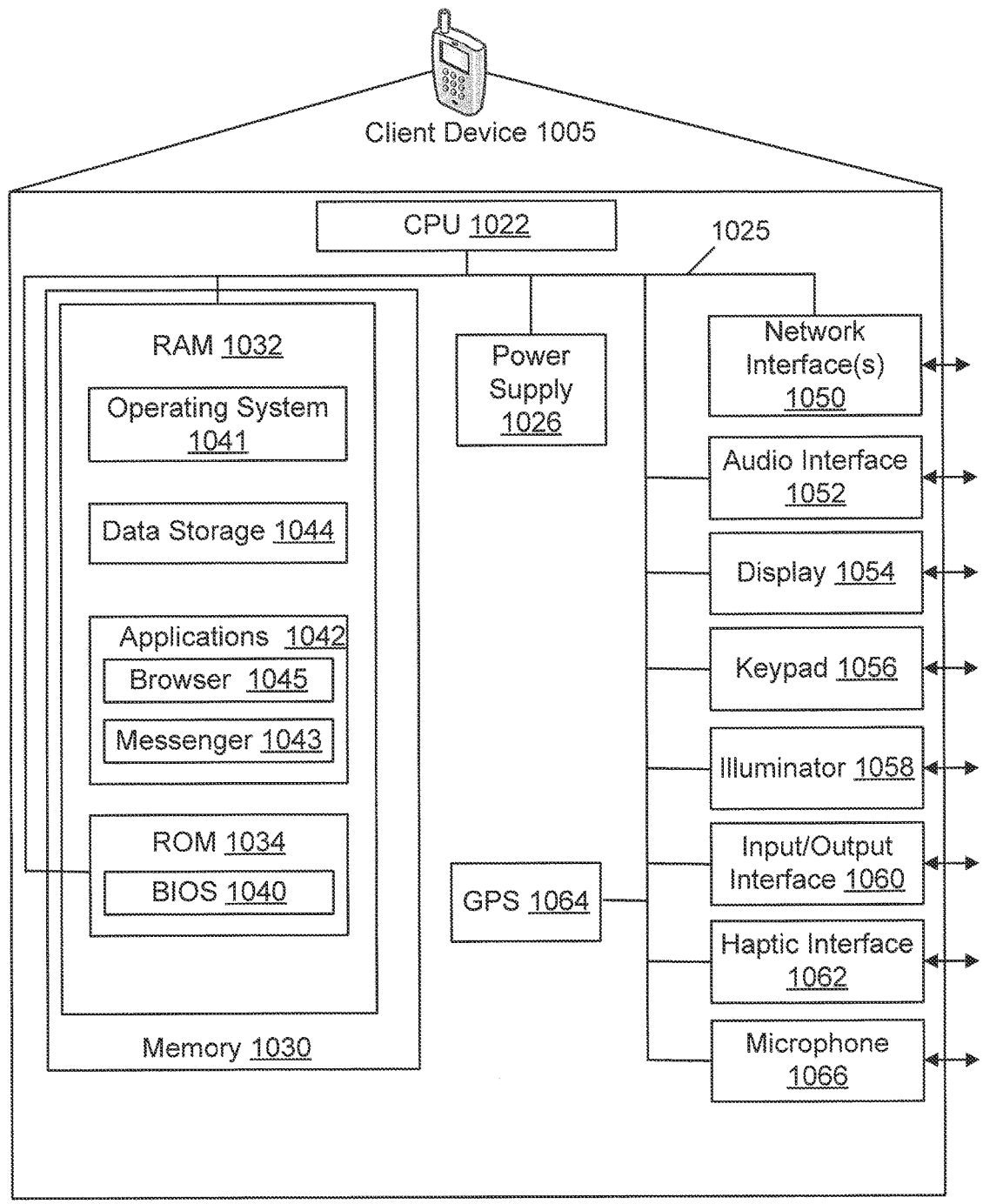
FIG. 10 depicts one example of a schematic diagram illustrating a client device in accordance with an embodiment of the present disclosure.

FIG. 10 depicts an example of a schematic diagram illustrating a client device 1005 (e.g., client device 105). Client device 1005 may include a computing device capable of sending or receiving signals, such as via a wired or wireless network. A client device 1005 may, for example, include a desktop computer or a portable device, such as a cellular telephone, a smartphone, a display pager, a radio frequency (RF) device, an infrared (IR) device, a Personal Digital Assistant (PDA), a handheld computer, a tablet computer, a laptop computer, a digital camera, a set top box, a wearable computer, an integrated device combining various features, such as features of the foregoing devices, or the like.

The client device 1005 may vary in terms of capabilities or features. Claimed subject matter is intended to cover a wide range of potential variations. For example, a cell phone may include a numeric keypad or a display of limited functionality, such as a monochrome liquid crystal display (LCD) for displaying text, pictures, etc. In contrast, however, as another example, a web-enabled client device may include one or more physical or virtual keyboards, mass storage, one or more accelerometers, one or more gyroscopes, global positioning system (GPS) or other location-identifying type capability, of a display with a high degree of functionality, such as a touch-sensitive color 2D or 3D display, for example.

A client device 1005 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

As shown in the example of FIG. 10, client device 1005 may include one or more processing units (also referred to herein as CPUs) 1022, which interface with at least one computer bus 1025. A memory 1030 can be persistent storage and interfaces with the computer bus 1025. The memory 1030 includes RAM 1032 and ROM 1034. ROM 1034 includes a BIOS 1040. Memory 1030 interfaces with computer bus 1025 so as to provide information stored in memory 1030 to CPU 1022 during execution of software programs such as an operating system 1041, application programs 1042, device drivers, and software modules 1043, 1045 that comprise program code, and/or computer-executable process steps, incorporating functionality described herein, e.g., one or more of process flows described herein. CPU 1022 first loads computer-executable process steps from storage, e.g., memory 1032, data storage medium/media 1044, removable media drive, and/or other storage device. CPU 1022 can then execute the stored process steps in order to execute the loaded computer-executable process steps. Stored data, e.g., data stored by a storage device, can be accessed by CPU 1022 during the execution of computer-executable process steps.

Persistent storage medium/media 1044 is a computer readable storage medium(s) that can be used to store software and data, e.g., an operating system and one or more application programs. Persistent storage medium/media 1044 can also be used to store device drivers, such as one or more of a digital camera driver, monitor driver, printer driver, scanner driver, or other device drivers, web pages, content files, playlists and other files. Persistent storage medium/media 1006 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Client device 1005 can also include one or more of a power supply 1026, network interface 1050, audio interface 1052, a display 1054 (e.g., a monitor or screen), keypad 1056, illuminator 1058, I/O interface 1060, a haptic interface 1062, a GPS 1064, a microphone 1066, a video camera, TV/radio tuner, audio/video capture card, sound card, analog audio input with A/D converter, modem, digital media input (HDMI, optical link), digital I/O ports (RS232, USB, Fire Wire, Thunderbolt), expansion slots (PCMCIA, Express-Card, PCI, PCIe).

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Figure 11:
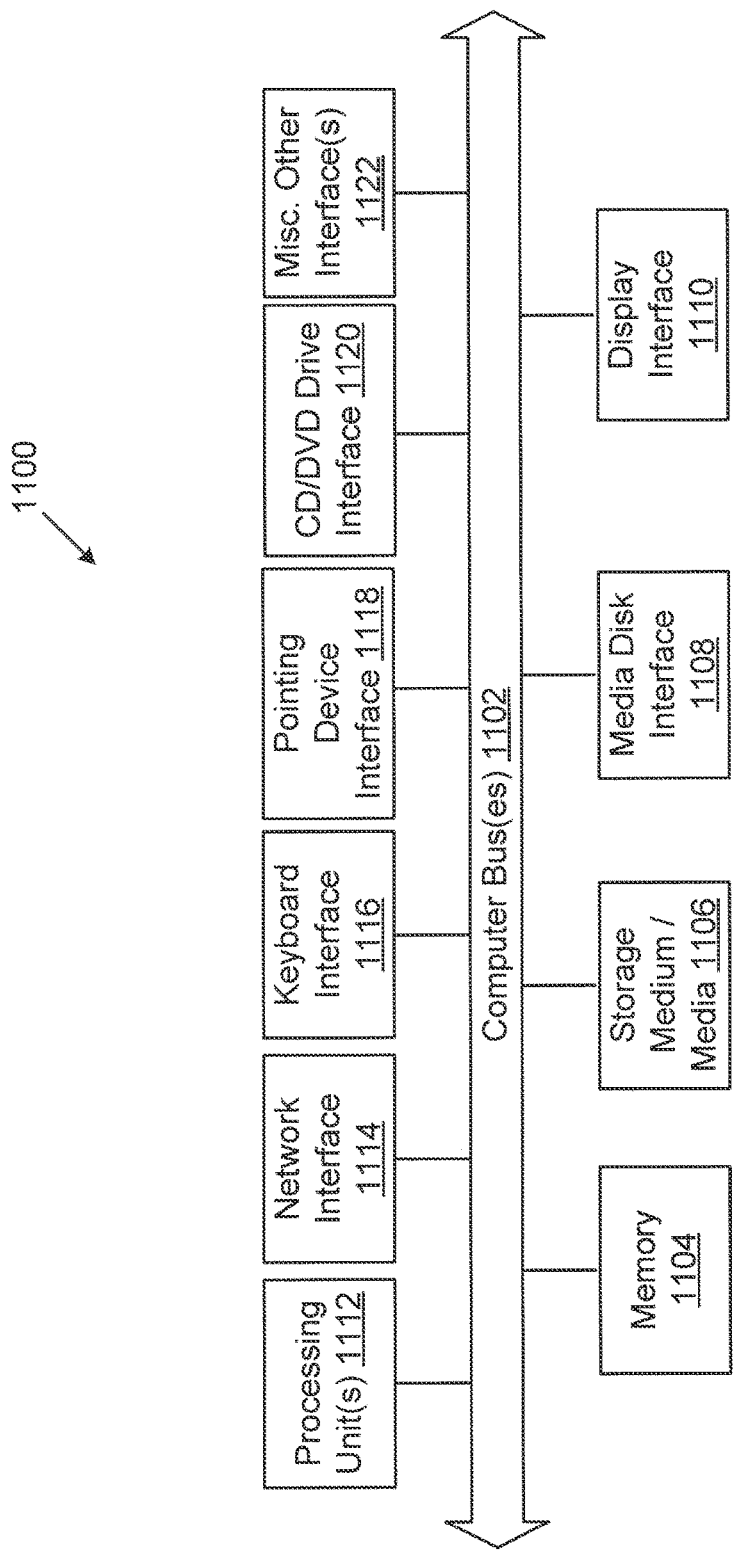
FIG. 11 is a block diagram illustrating an internal architecture of a computer in accordance with an embodiment of the present disclosure.

FIG. 11 is a block diagram illustrating an internal architecture of an example of a computer, such as server computer 130 and/or client device 105, in accordance with one or more embodiments of the present disclosure. A computer as referred to herein refers to any device with a processor capable of executing logic or coded instructions, and could be a server, personal computer, set top box, tablet, smart phone, pad computer or media device, to name a few such devices. As shown in the example of FIG. 11, internal architecture 1100 includes one or more processing units (also referred to herein as CPUs) 1112, which interface with at least one computer bus 1102. Also interfacing with computer bus 1102 are persistent storage medium/media 1106, network interface 1114, memory 1104, e.g., random access memory (RAM), run-time transient memory, read only memory (ROM), etc., media disk drive interface 1108 as an interface for a drive that can read and/or write to media including removable media such as floppy, CD-ROM, DVD, etc. media, display interface 1110 as interface for a monitor or other display device, keyboard interface 1116 as interface for a keyboard, pointing device interface 1118 as an interface for a mouse or other pointing device, and miscellaneous other interfaces not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code, and/or computer-executable process steps, incorporating functionality described herein, e.g., one or more of process flows described herein. CPU 1112 first loads computer-executable process steps from storage, e.g., memory 1104, storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

As described above, persistent storage medium/media 1106 is a computer readable storage medium(s) that can be used to store software and data, e.g., an operating system and one or more application programs. Persistent storage medium/media 1106 can also be used to store device drivers, such as one or more of a digital camera driver, monitor driver, printer driver, scanner driver, or other device drivers, web pages, content files, playlists and other files. Persistent storage medium/media 1106 can further include program modules and data files used to implement one or more embodiments of the present disclosure.

Internal architecture 1100 of the computer can include (as stated above), a microphone, video camera, TV/radio tuner, audio/video capture card, sound card, analog audio input with A/D converter, modem, digital media input (HDMI, optical link), digital I/O ports (RS232, USB, FireWire, Thunderbolt), and/or expansion slots (PCMCIA, ExpressCard, PCI, PCIe).

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user computing device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   determining, by a server computer, an identity of a media program being displayed on a display device at a first time, the identity determined based on an audio signal fingerprint associated with the media program;
   retrieving, by the server computer, closed captioning text associated with the media program based on the identity of the media program;
   determining, by the server computer, a subject matter of a portion of the media program from the closed captioning text;
   constructing, by the server computer, a query associated with the determined subject matter;
   submitting, by the server computer, the query to a computer network as a search query;
   receiving, by the server computer in response to the submitting of the query, content relating to the subject matter at a second time;
   measuring, by the server computer, an elapsed time period between the first time and the second time;
   ranking, by the server computer, the content;
   when the elapsed time period is less than a predetermined period of time, communicating, by the server computer to a client device separate from the display device, information related to the content; and
   when the elapsed time period is less than the predetermined period of time, communicating, by the server computer, a first document in the content, the first document ranked above a predetermined threshold, to the client device.

2. The method of claim 1, wherein the communicating of the information further comprises communicating one or more of a link to the content, a web page, or the content.

3. The method of claim 1, wherein the obtaining of the subject matter further comprises identifying topics associated with the portion of the media program.

4. The method of claim 3, wherein the identifying of the topics further comprises determining a theme from segments of consecutive lines of text in the closed captioning text.

5. The method of claim 4, wherein the determining of the theme further comprises defining a theme based on a sliding window scheme, which is a windowed approach to build candidate segments.

6. The method of claim 4, wherein the constructing of the query further comprises constructing the query utilizing consecutive lines in the closed captioning text.

7. The method of claim 6, further comprising extracting entities from a plurality of documents by extracting terms from the closed captioning text that reflect the theme.

8. The method of claim 7, wherein the plurality of documents comprise news articles.

9. The method of claim 1, wherein the subject matter is a news story.

10. A computing device comprising:
    a processor;
    a storage medium for tangibly storing thereon program logic for execution by the processor, the program logic comprising:
      determining logic executed by a processor for determining an identity of a media program being displayed on a display device at a first time, the identity determined based on an audio signal fingerprint associated with the media program;
      retrieving logic executed by the processor for retrieving closed captioning text associated with the media program based on the identity of the media program;
      determining logic executed by the processor for determining a subject matter of a portion of the media program from the closed captioning text;

constructing logic executed by the processor for constructing a query associated with the determined subject matter;

submitting logic executed by the processor for submitting the query to a computer network as a search query;

receiving logic executed by the processor for receiving, in response to the submitting of the query, content relating to the subject matter at a second time;

measuring logic executed by the processor for measuring an elapsed time period between the first time and the second time;

ranking logic executed by the processor for ranking the content;

first communicating logic executed by the processor for communicating, when the elapsed time period is less than a predetermined period of time, to a client device separate from the display device, information related to the content; and second communicating logic executed by the processor for communicating, when the elapsed time period is less than a predetermined period of time, to the client device, a first document in the content, the first document ranked above a predetermined threshold, to the client device.

11. The computing device of claim 10, wherein the communicating logic for communicating the information further comprises communicating logic for communicating one or more of a link to the content, a web page, or the content.

12. The computing device of claim 10, wherein the obtaining logic for obtaining the subject matter further comprises identifying logic executed by the processor for identifying topics associated with the portion of the media program.

13. The computing device of claim 12, wherein the identifying logic for identifying the topics further comprises defining logic for defining a theme from segments of consecutive lines in the closed captioning text.

14. The computing device of claim 12, wherein the constructing logic for constructing the query further comprises constructing logic for constructing the query out of consecutive lines in the closed captioning text.

15. The computing device of claim 14, further comprising extracting logic executed by the processor for extracting entities from a plurality of documents by extracting terms from the closed captioning text that reflect the theme.

16. A non-transitory computer readable storage medium tangibly storing computer program instructions capable of being executed by a computer processor, the computer program instructions defining the steps of:

determining, by the computer processor, an identity of a media program being displayed on a display device at a first time, the identity determined based on an audio signal fingerprint associated with the media program;

retrieving, by the computer processor, closed captioning text associated with the media program based on the identity of the media program;

determining, by the computer processor, a subject matter of a portion of the media program from the closed captioning text;

constructing, by the computer processor, a query associated with the determined subject matter;

submitting, by the computer processor, the query to a computer network as a search query;

receiving, by the computer processor in response to the submitting of the query, content relating to the subject matter at a second time;

measuring, by the computer processor, an elapsed time period between the first time and the second time;

ranking, by the computer processor, the content;

when the elapsed time period is less than a predetermined period of time, communicating, by the computer processor to a client device separate from the display device, information related to the content; and when the elapsed time period is less than the predetermined period of time, communicating, by the server computer, a first document in the content, the first document ranked above a predetermined threshold, to the client device.

17. The non-transitory computer readable storage medium of claim 16 wherein the communicating of the information further comprises communicating one or more of a link to the content, a web page, or the content.

* * * * *